(12) United States Patent
Knight et al.

(10) Patent No.: US 10,225,263 B2
(45) Date of Patent: Mar. 5, 2019

(54) CONTROLLING INCOMING DATA PROCESSING REQUESTS

(71) Applicant: Citrix Systems, Inc., Fort Lauderdale, FL (US)

(72) Inventors: Jason Knight, Sheffield Village, OH (US); Nitin Desai, Coral Springs, FL (US); Gary Barton, Boca Raton, FL (US); Sameer Mehta, San Francisco, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 101 days.

(21) Appl. No.: 14/967,958

(22) Filed: Dec. 14, 2015

(65) Prior Publication Data
US 2016/0173503 A1 Jun. 16, 2016

Related U.S. Application Data (60) Provisional application No. 62/091,988, filed on Dec. 15, 2014.

(51) Int. Cl.
*G06F 21/60* (2013.01)
*H04L 29/06* (2006.01)
*G06F 21/54* (2013.01)

(52) U.S. Cl.
CPC ............ *H04L 63/105* (2013.01); *G06F 21/54* (2013.01); *G06F 21/604* (2013.01); *H04L 63/12* (2013.01)

(58) Field of Classification Search
CPC ..... H04L 63/101; H04L 63/105; G06F 21/53; G06F 21/125; G06F 21/126; G06F 21/604
See application file for complete search history.

(56) References Cited

U.S. PATENT DOCUMENTS

| 9,235,717 B1* | 1/2016 | Kim | G06F 21/606 |
| 9,430,641 B1* | 8/2016 | Marion | G06F 21/53 |
| 2006/0225137 A1* | 10/2006 | Odins-Lucas | G06F 21/51 |
| | | | 726/27 |
| 2008/0028442 A1* | 1/2008 | Kaza | G06F 21/56 |
| | | | 726/4 |
| 2010/0095277 A1* | 4/2010 | Cheng | G06F 8/71 |
| | | | 717/127 |

(Continued)

FOREIGN PATENT DOCUMENTS

WO 2014/084967 A1 6/2014

OTHER PUBLICATIONS

Ongtang, M. et al., "Semantically Rich Application-Centric Security in Android," Computer Security Applications Conference, 2009. ACSAC '09. Annual, IEEE, Piscataway, NJ. Dec. 7, 2009.

(Continued)

*Primary Examiner* — David J Pearson
(74) *Attorney, Agent, or Firm* — Banner & Witcoff, Ltd.

(57) ABSTRACT

Aspects described herein relate to controlling incoming data processing requests or messages and whether the incoming data processing requests are allowed to reach destination applications unmodified. The destination application may be a secure application operating within a secure application wrapper, and the secure application wrapper may determine whether and how much of the request or message is allowed to pass into a managed partition or through the secure application wrapper to reach the secure application for processing.

20 Claims, 6 Drawing Sheets

(56) References Cited

U.S. PATENT DOCUMENTS

| | | | | |
|---|---|---|---|---|
| 2012/0304310 A1* | 11/2012 | Blaisdell | ............... | G06F 21/52 |
| | | | | 726/28 |
| 2013/0091543 A1* | 4/2013 | Wade | ............... | G06F 21/54 |
| | | | | 726/1 |
| 2014/0090055 A1* | 3/2014 | Palumbo | ............... | H04L 63/145 |
| | | | | 726/22 |
| 2014/0173700 A1* | 6/2014 | Awan | ............... | H04L 63/107 |
| | | | | 726/4 |
| 2014/0181896 A1* | 6/2014 | Yablokov | ............... | H04L 63/10 |
| | | | | 726/1 |
| 2016/0085602 A1* | 3/2016 | Jacobson | ............... | G06F 9/546 |
| | | | | 726/30 |

OTHER PUBLICATIONS

Rubin XU Computer Laboratory University of Cambridge et al., "Aurasium: Practical Policy Enforcement for Android Applications," USENIX, Apr. 11, 2013.

Mar. 2, 2016 (WO) International Search Report and Written Opinion—App. PCT/US2015/065690.

Jul. 10, 2018—(EP) Examination Report—App 15823061.5.

\* cited by examiner

CONTROLLING INCOMING DATA PROCESSING REQUESTS

FIELD

Aspects described herein generally relate to software applications for mobile devices and other computing devices. More specifically, certain aspects described herein relate to securely passing data between applications and controlling and/or limiting data passed to a secure or managed application.

BACKGROUND

For user friendliness and convenience, software applications on a computing device, for example a mobile device, are able to interact with each other and pass information between each other rather than acting as isolated, standalone applications. As software applications on a device are able to increasingly interact with each other and pass information between each other, the security of the data being passed between the software applications is of increasing concern.

BRIEF SUMMARY

The following presents a simplified summary of various aspects described herein. This summary is not an extensive overview, and is not intended to identify key or critical elements. The following summary merely presents some concepts in a simplified form as an introductory prelude to the more detailed description provided below.

To overcome limitations in the prior art described above, and to overcome other limitations that will be apparent upon reading and understanding the present specification, aspects described herein are directed towards controlling incoming data processing requests or messages and whether the incoming data processing requests are allowed to reach destination applications unmodified. In some aspects, the destination application may be a secure application operating within a secure application wrapper, and the secure application wrapper may determine whether and how much of the request or message is allowed to pass into a managed partition or through the secure application wrapper to reach the secure application for processing.

In accordance with one or more aspects, the incoming data processing requests or messages may be allowed, blocked, and/or modified based on the application that is the source of the data. If the source application of the data is determined to be untrusted, the request or message may be modified by removing the additional or optional data included in the request or message before allowing the request or message to pass to the destination application.

One or more aspects of the disclosure provide for a method that may include receiving, by a secure application wrapper implemented on a computing device comprising a processor, a message containing data, the message indicating an action to perform on the data and a destination application within the secure application wrapper on the computing device and determining, by the secure application wrapper, whether the action corresponds to receiving data from another application to process in the destination application. The method may also include responsive to determining that the action corresponds to receiving data from another application to process in the destination application and determining, by the secure application wrapper, an application source of the data, determining, by the secure application wrapper, a security level associated with the application source of the data. The method may also include determining, by the secure application wrapper and based on the security level associated with the application source of the data, whether to allow the message to pass unmodified to the destination application to process the data according to the action.

One or more aspects of the disclosure provide for a system that includes at least one processor; and at least one memory storing instructions that, when executed by the at least one processor, cause the system to perform one or more steps. The steps the system may perform may include receiving, by a secure application wrapper implemented by the at least one processor, a message containing data, the message indicating an action to perform on the data and a destination application within the secure application wrapper on the computing device and determining, by the secure application wrapper, whether the action corresponds to receiving data from another application to process in the destination application. The steps may include responsive to determining that the action corresponds to receiving data from another application to process in the destination application, determining, by the secure application wrapper, an application source of the data and determining, by the secure application wrapper, a security level associated with the application source of the data. The steps may include determining, by the secure application wrapper and based on the security level associated with the application source of the data, whether to allow the message to pass unmodified to the destination application to process the data according to the action.

One or more aspects of the disclosure provide for one or more non-transitory computer-readable storage media having instructions stored thereon, that when executed by one or more processors, may cause the one or more processors to perform steps. The steps that the one or more processors perform may include receiving, by a secure application wrapper implemented by the one or more processors, a message containing data, the message indicating an action to perform on the data and a destination application within the secure application wrapper on the computing device and determining, by the secure application wrapper, whether the action corresponds to receiving data from another application to process in the destination application. The steps may include responsive to determining that the action corresponds to receiving data from another application to process in the destination application, determining, by the secure application wrapper, an application source of the data and determining, by the secure application wrapper, a security level associated with the application source of the data. The steps may include determining, by the secure application wrapper and based on the security level associated with the application source of the data, whether to allow the message to pass unmodified to the destination application to process the data according to the action.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed towards controlling incoming data processing requests or messages and whether the incoming data processing requests are allowed to reach destination applications unmodified. Whether the incoming data processing requests are allowed to reach destination applications modified or unmodified may be determined based on whether the source application of the incoming data, request, or message is a trusted or untrusted source. Aspects described herein are beneficial in that they enable an application or a secure area to evaluate the data on the receiving end and control what data is allowed into the application or the secure area of a device.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Computing Architecture

Figure 1:
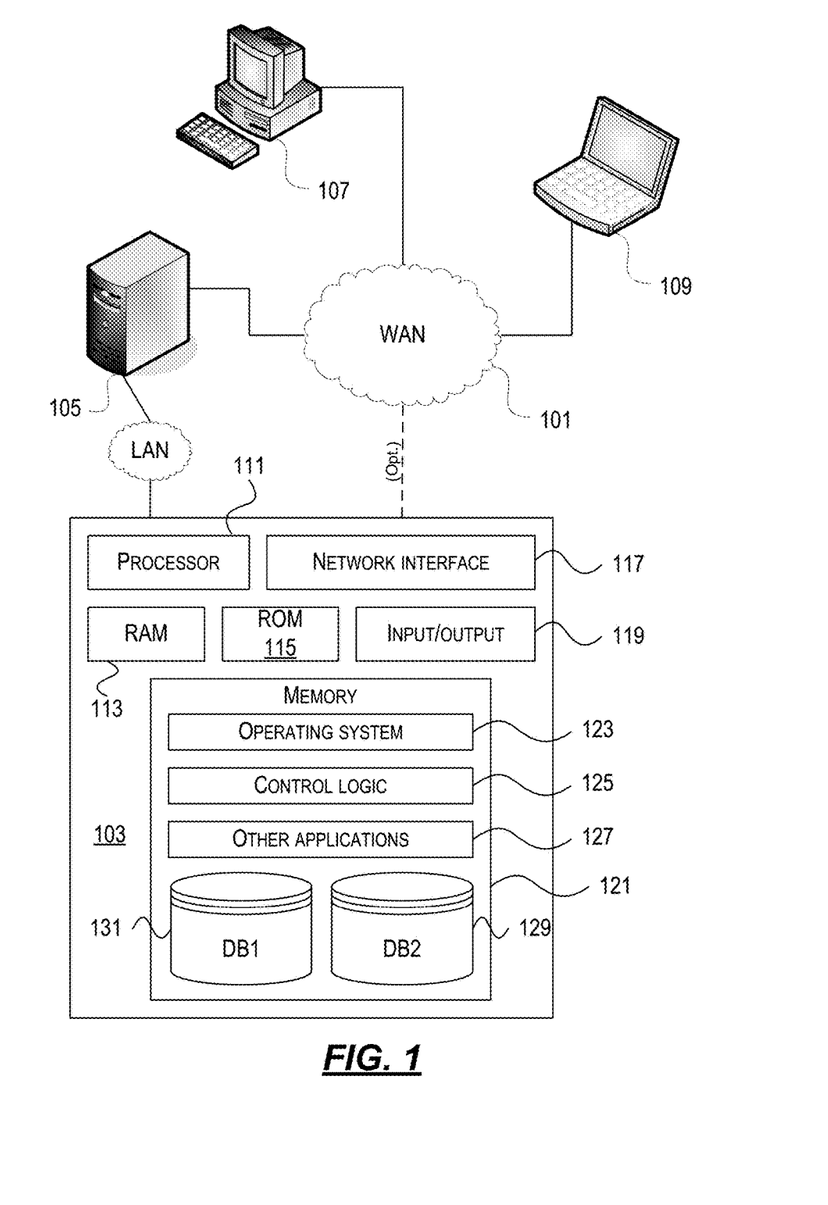
FIG. 1 depicts an illustrative computer system architecture that may be used in accordance with one or more illustrative aspects described herein.

Computer software, hardware, and networks may be utilized in a variety of different system environments, including standalone, networked, remote-access (aka, remote desktop), virtualized, and/or cloud-based environments, among others. FIG. 1 illustrates one example of system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, LANs, metropolitan area networks (MAN) wireless networks, personal networks (PAN), and the like. Network 101 is for illustration purposes and may be replaced with fewer or additional computer networks. A local area network (LAN) may have one or more of any known LAN topology and may use one or more of a variety of different protocols, such as Ethernet. Devices 103, 105, 107, 109 and other devices (not shown) may be connected to one or more of the networks via twisted pair wires, coaxial cable, fiber optics, radio waves or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the rate server 103. Data server 103 may further include RAM 113, ROM 115, network interface 117, input/output interfaces 119 (e.g., keyboard, mouse, display, printer, etc.), and memory 121. I/O 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or may not be used in conjunction with aspects described herein. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, 109 may have similar or different architecture as described with respect to device 103. Those of skill in the art will appreciate that the functionality of data processing device 103 (or device 105, 107, 109) as described herein may be spread across multiple data processing devices, for example, to distribute processing load across multiple computers, to segregate transactions based on geographic location, user access level, quality of service (QoS), etc.

Figure 2:
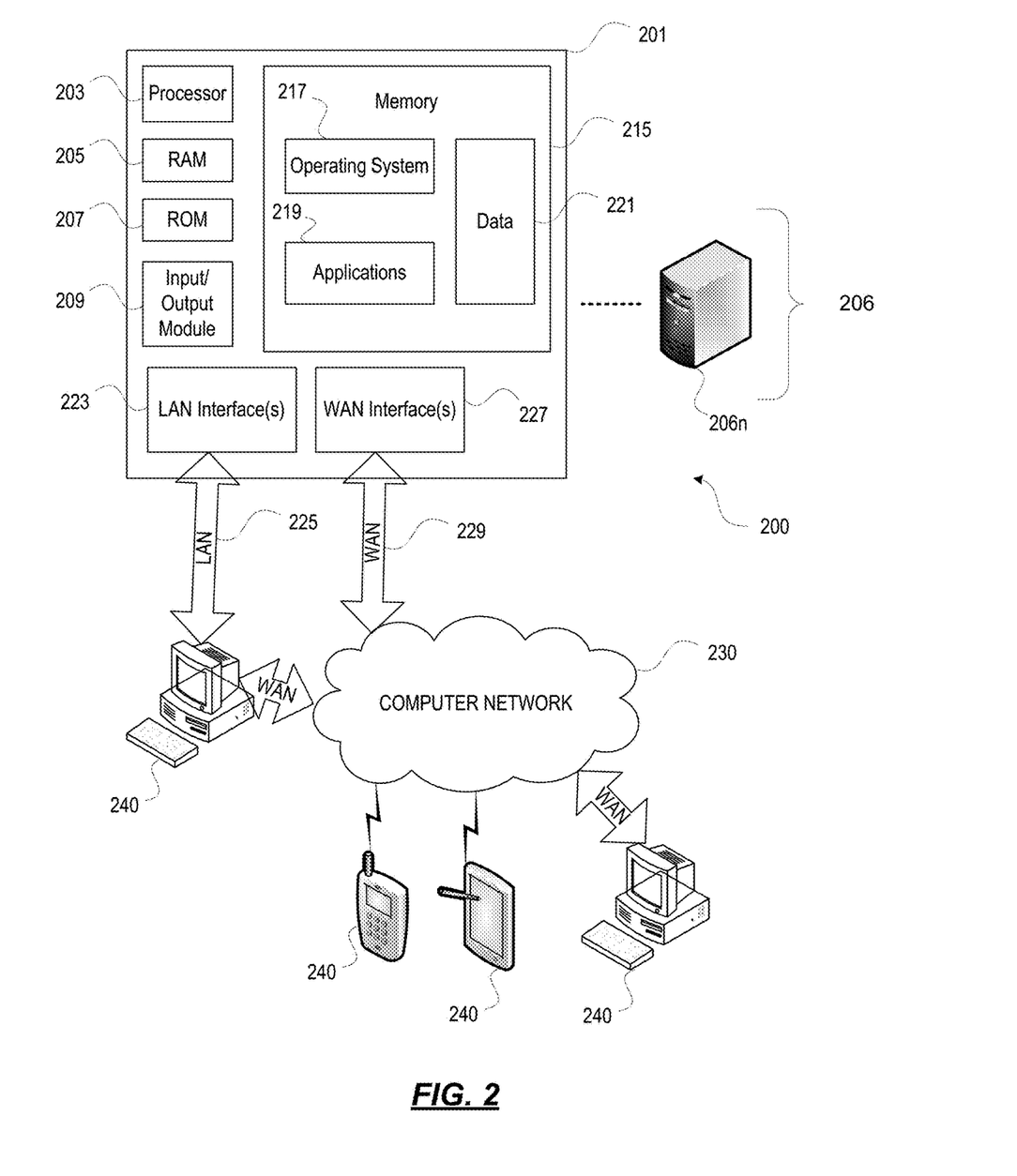
FIG. 2 depicts an illustrative remote-access system architecture that may be used in accordance with one or more illustrative aspects described herein.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein With further reference to FIG. 2, one or more aspects described herein may be implemented in a remote-access environment. FIG. 2 depicts an example system architecture including a generic computing device 201 in an illustrative computing environment 200 that may be used according to one or more illustrative aspects described herein. For example, generic computing device 201 may be used as a server 206a in a single-server or multi-server desktop virtualization system (e.g., a remote access or cloud system) configured to provide virtual machines for client access devices. The generic computing device 201 may have a processor 203 for controlling overall operation of the server and its associated components, including random access memory (RAM) 205, read-only memory (ROM) 207, input/output (I/O) module 209, and memory 215.

I/O module 209 may include a mouse, keypad, touch screen, scanner, optical reader, and/or stylus (or other input device(s)) through which a user of generic computing device 201 may provide input, and may also include one or more of a speaker for providing audio output and a video display device for providing textual, audiovisual, and/or graphical output. Software may be stored within memory 215 and/or other storage to provide instructions to processor 203 for configuring generic computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices). The terminals 240 may be personal computers, mobile devices, laptop computers, tablets, or servers that include many or all of the elements described above with respect to the generic computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem 227 or other wide area network interface for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, PDAs, notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network PCs, mini-computers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute an application management agent (or client agent program or application) to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while and logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, SYMBIAN, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a SSL VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 206a that receives requests from a client machine 240, forwards the request to a second server 206b, and responds to the request generated by the client machine 240 with a response from the second server 206b. First server 206a may acquire an enumeration of applications available to the client machine 240 and well as address information associated with an application server 206 hosting an application identified within the enumeration of applications. First server 206a can then present a response to the client's request using a web interface, and communicate directly with the client 240 to provide the client 240 with access to an identified application. One or more clients 240 and/or one or more servers 206 may transmit data over network 230, e.g., network 101.

FIG. 2 shows a high-level architecture which may be illustrative of a desktop virtualization system. As shown, the desktop virtualization system may be single-server or multi-server system, or cloud system, including at least one virtualization server 206 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

When utilized in a desktop virtualization system, server 206 may be configured as virtualization server in a virtualization environment, for example, a single-server, multi-server, or cloud computing environment. In such embodiments, the virtualization server 206 may include a hardware layer including one or more physical disks, physical devices, physical processors, and physical memories. The memory 215 of the virtualization server 206 may include firmware, an operating system, and a hypervisor (e.g., a Type 1 or Type 2 hypervisor) configured to create and manage any number of virtual machines. A virtual machine is a set of executable instructions that, when executed by a processor, imitate the operation of a physical computer such that the virtual machine can execute programs and processes much like a physical computing device. The hypervisor may provide each virtual machine with a virtual view of the physical hardware, memory, processor and other system resources available to that virtual machine.

Some aspects described herein may be implemented in a cloud-based environment. In such environments, client devices 240 may communicate with one or more cloud management servers 206 to access the computing resources (e.g., host servers, storage resources, and network resources) of the cloud system. Cloud management servers 206 may manage various computing resources, including cloud hardware and software resources, and may provide user interfaces through which cloud operators and cloud customers may interact with the cloud system. For example, management servers 206 may provide a set of APIs and/or one or more cloud operator console applications (e.g., web-based or standalone applications) with user interfaces to allow cloud operators to manage the cloud resources, configure the virtualization layer, manage customer accounts, and perform other cloud administration tasks. Management servers 206 also may include a set of APIs and/or one or more customer console applications with user interfaces configured to receive cloud computing requests from end users via client computers 240, for example, requests to create, modify, or destroy virtual machines within the cloud. Client computers 240 may connect to management server 206 via the Internet or other communication network, and may request access to one or more of the computing resources managed by management server 206. In response to client requests, the management server 206 may include a resource manager configured to select and provision physical resources in the hardware layer of the cloud system based on the client requests. For example, the management server 206 and additional components of the cloud system may be configured to provision, create, and manage virtual machines and their operating environments (e.g., hypervisors, storage resources, services offered by the network elements, etc.) for customers at client computers 240, over a network (e.g., the Internet), providing customers with computational resources, data storage services, networking capabilities, and computer platform and application support. Cloud systems also may be configured to provide various specific services, including security systems, development environments, user interfaces, and the like.

Cloud computing environments also may include virtualization layer with additional hardware and/or software resources configured to create and manage virtual machines and provide other services to customers using the physical resources in the cloud. The virtualization layer may include hypervisors, as described above, along with other components to provide network virtualizations, storage virtualizations, etc. The virtualization layer may be as a separate layer from the physical resource layer, or may share some or all of the same hardware and/or software resources with the physical resource layer.

Enterprise Mobility Management Architecture

Figure 3:
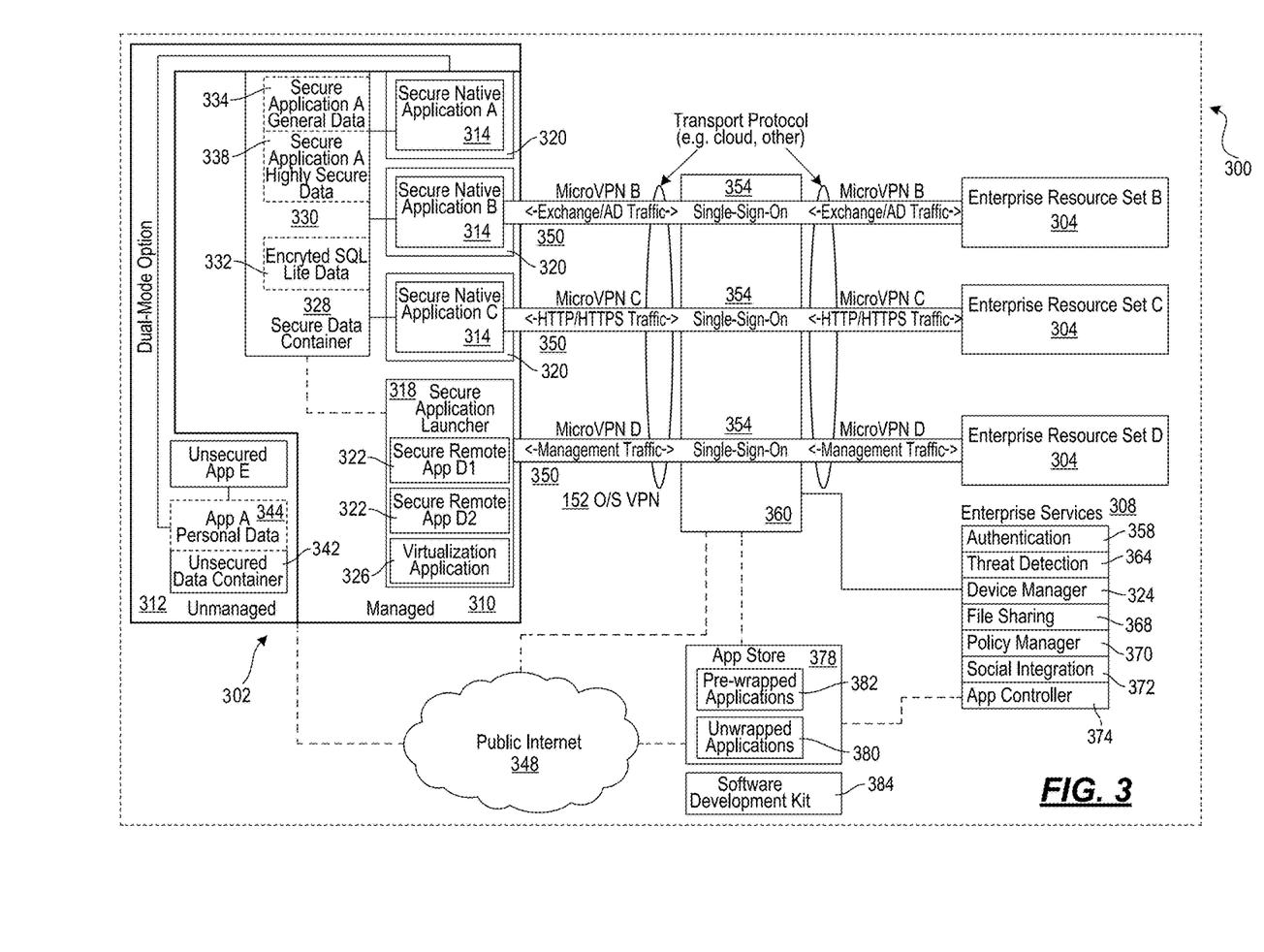
FIG. 3 depicts an illustrative enterprise mobility management system in accordance with one or more illustrative aspects described herein.

FIG. 3 represents an enterprise mobility technical architecture 300 for use in a BYOD environment. The architecture enables a user of a mobile device 302 to both access enterprise or personal resources from a mobile device 302 and use the mobile device 302 for personal use. The user may access such enterprise resources 304 or enterprise services 308 using a mobile device 302 that is purchased by the user or a mobile device 302 that is provided by the enterprise to the user. The user may utilize the mobile device 302 for business use only or for business and personal use. The mobile device may run an iOS operating system, Android operating system, and/or the like. The enterprise may choose to implement policies to manage the mobile device 304. The policies may be implanted through a firewall or gateway in such a way that the mobile device may be identified, secured or security verified, and provided selective or full access to the enterprise resources. The policies may be mobile device management policies, mobile application management policies, mobile data management policies, or some combination of mobile device, application, and data management policies. A mobile device 304 that is managed through the application of mobile device management policies may be referred to as an enrolled device or a managed device.

In some embodiments, the operating system of the mobile device may be separated into a managed partition 310 and an unmanaged partition 312. The managed partition 310 may have policies applied to it to secure the applications running on and data stored in the managed partition. In other embodiments, all applications may execute in accordance with a set of one or more policy files received separate from the application, and which define one or more security parameters, features, resource restrictions, and/or other access controls that are enforced by the mobile device management system when that application is executing on the device. By operating in accordance with their respective policy file(s), each application may be allowed or restricted from communications with one or more other applications and/or resources, thereby creating a virtual partition. Thus, as used herein, a partition may refer to a physically partitioned portion of memory (physical partition), a logically partitioned portion of memory (logical partition), and/or a virtual partition created as a result of enforcement of one or more policies and/or policy files across multiple apps as described herein (virtual partition). Stated differently, by enforcing policies on managed apps, those apps may be restricted to only be able to communicate with other managed apps and trusted enterprise resources, thereby creating a virtual partition that is impenetrable by unmanaged apps and devices.

The applications running on the managed partition may be secure applications. The secure applications may be email applications, web browsing applications, software-as-a-service (SaaS) access applications, Windows Application access applications, and the like. The secure applications may be secure native applications 314, secure remote applications 322 executed by a secure application launcher 318, virtualization applications 326 executed by a secure application launcher 318, and the like. The secure native applications 314 may be wrapped by a secure application wrapper 320. The secure application wrapper 320 may include integrated policies that are executed on the mobile device 302 when the secure native application is executed on the device. The secure application wrapper 320 may include meta-data that points the secure native application 314 running on the mobile device 302 to the resources hosted at the enterprise that the secure native application 314 may require to complete the task requested upon execution of the secure native application 314. The secure remote applications 322 executed by a secure application launcher 318 may be executed within the secure application launcher application 318. The virtualization applications 326 executed by a secure application launcher 318 may utilize resources on the mobile device 302, at the enterprise resources 304, and the like. The resources used on the mobile device 302 by the virtualization applications 326 executed by a secure application launcher 318 may include user interaction resources, processing resources, and the like. The user interaction resources may be used to collect and transmit keyboard input, mouse input, camera input, tactile input, audio input, visual input, gesture input, and the like. The processing resources may be used to present a user interface, process data received from the enterprise resources 304, and the like. The resources used at the enterprise resources 304 by the virtualization applications 326 executed by a secure application launcher 318 may include user interface generation resources, processing resources, and the like. The user interface generation resources may be used to assemble a user interface, modify a user interface, refresh a user interface, and the like. The processing resources may be used to create information, read information, update information, delete information, and the like. For example, the virtualization application may record user interactions associated with a GUI and communicate them to a server application where the server application will use the user interaction data as an input to the application operating on the server. In this arrangement, an enterprise may elect to maintain the application on the server side as well as data, files, etc. associated with the application. While an enterprise may elect to "mobilize" some applications in accordance with the principles herein by securing them for deployment on the mobile device, this arrangement may also be elected for certain applications. For example, while some applications may be secured for use on the mobile device, others may not be prepared or appropriate for deployment on the mobile device so the enterprise may elect to provide the mobile user access to the unprepared applications through virtualization techniques. As another example, the enterprise may have large complex applications with large and complex data sets (e.g. material resource planning applications) where it would be very difficult, or otherwise undesirable, to customize the application for the mobile device so the enterprise may elect to provide access to the application through virtualization techniques. As yet another example, the enterprise may have an application that maintains highly secured data (e.g. human resources data, customer data, engineering data) that may be deemed by the enterprise as too sensitive for even the secured mobile environment so the enterprise may elect to use virtualization techniques to permit mobile access to such applications and data. An enterprise may elect to provide both fully secured and fully functional applications on the mobile device as well as a virtualization application to allow access to applications that are deemed more properly operated on the server side. In an embodiment, the virtualization application may store some data, files, etc. on the mobile phone in one of the secure storage locations. An enterprise, for example, may elect to allow certain information to be stored on the phone while not permitting other information.

In connection with the virtualization application, as described herein, the mobile device may have a virtualization application that is designed to present GUI's and then record user interactions with the GUI. The application may communicate the user interactions to the server side to be used by the server side application as user interactions with the application. In response, the application on the server side may transmit back to the mobile device a new GUI. For example, the new GUI may be a static page, a dynamic page, an animation, or the like.

The secure applications may access data stored in a secure data container 328 in the managed partition 310 of the mobile device. The data secured in the secure data container may be accessed by the secure wrapped applications 314, applications executed by a secure application launcher 318, virtualization applications 326 executed by a secure application launcher 318, and the like. The data stored in the secure data container 328 may include files, databases, and the like. The data stored in the secure data container 328 may include data restricted to a specific secure application 330, shared among secure applications 332, and the like. Data restricted to a secure application may include secure general data 334 and highly secure data 338. Secure general data may use a strong form of encryption such as AES 128-bit encryption or the like, while highly secure data 338 may use a very strong form of encryption such as AES 256-bit encryption. Data stored in the secure data container 328 may be deleted from the device upon receipt of a command from the device manager 324. The secure applications may have a dual-mode option 340. The dual mode option 340 may present the user with an option to operate the secured application in an unsecured mode. In an unsecured mode, the secure applications may access data stored in an unsecured data container 342 on the unmanaged partition 312 of the mobile device 302. The data stored in an unsecured data container may be personal data 344. The data stored in an unsecured data container 342 may also be accessed by unsecured applications 348 that are running on the unmanaged partition 312 of the mobile device 302. The data stored in an unsecured data container 342 may remain on the mobile device 302 when the data stored in the secure data container 328 is deleted from the mobile device 302. An enterprise may want to delete from the mobile device selected or all data, files, and/or applications owned, licensed or controlled by the enterprise (enterprise data) while leaving or otherwise preserving personal data, files, and/or applications owned, licensed or controlled by the user (personal data). This operation may be referred to as a selective wipe. With the enterprise and personal data arranged in accordance to the aspects described herein, an enterprise may perform a selective wipe.

The mobile device may connect to enterprise resources 304 and enterprise services 308 at an enterprise, to the public Internet 348, and the like. The mobile device may connect to enterprise resources 304 and enterprise services 308 through virtual private network connections. The virtual private network connections (also referred to at microVPN or application-specific VPN) may be specific to particular applications 350, particular devices, particular secured areas on the mobile device, and the like (e.g., 352). For example, each of the wrapped applications in the secured area of the phone may access enterprise resources through an application specific VPN such that access to the VPN would be granted based on attributes associated with the application, possibly in conjunction with user or device attribute information. The virtual private network connections may carry Microsoft Exchange traffic, Microsoft Active Directory traffic, HTTP traffic, HTTPS traffic, application management traffic, and the like. The virtual private network connections may support and enable single-sign-on authentication processes 354. The single-sign-on processes may allow a user to provide a single set of authentication credentials, which are then verified by an authentication service 358. The authentication service 358 may then grant to the user access to multiple enterprise resources 304, without requiring the user to provide authentication credentials to each individual enterprise resource 304.

The virtual private network connections may be established and managed by an access gateway 360. The access gateway 360 may include performance enhancement features that manage, accelerate, and improve the delivery of enterprise resources 304 to the mobile device 302. The access gateway may also re-route traffic from the mobile device 302 to the public Internet 348, enabling the mobile device 302 to access publicly available and unsecured applications that run on the public Internet 348. The mobile device may connect to the access gateway via a transport network 362. The transport network 362 may be a wired network, wireless network, cloud network, local area network, metropolitan area network, wide area network, public network, private network, and the like.

The enterprise resources 304 may include email servers, file sharing servers, SaaS applications, Web application servers, Windows application servers, and the like. Email servers may include Exchange servers, Lotus Notes servers, and the like. File sharing servers may include ShareFile servers, and the like. SaaS applications may include Salesforce, and the like. Windows application servers may include any application server that is built to provide applications that are intended to run on a local Windows operating system, and the like. The enterprise resources 304 may be premise-based resources, cloud based resources, and the like. The enterprise resources 304 may be accessed by the mobile device 302 directly or through the access gateway 360. The enterprise resources 304 may be accessed by the mobile device 302 via a transport network 362. The transport network 362 may be a wired network, wireless network, cloud network, local area network, metropolitan area network, wide area network, public network, private network, and the like.

The enterprise services 308 may include authentication services 358, threat detection services 364, device manager services 324, file sharing services 368, policy manager services 370, social integration services 372, application controller services 374, and the like. Authentication services 358 may include user authentication services, device authentication services, application authentication services, data authentication services and the like. Authentication services 358 may use certificates. The certificates may be stored on the mobile device 302, by the enterprise resources 304, and the like. The certificates stored on the mobile device 302 may be stored in an encrypted location on the mobile device, the certificate may be temporarily stored on the mobile device 302 for use at the time of authentication, and the like. Threat detection services 364 may include intrusion detection services, unauthorized access attempt detection services, and the like. Unauthorized access attempt detection services may include unauthorized attempts to access devices, applications, data, and the like. Device management services 324 may include configuration, provisioning, security, support, monitoring, reporting, and decommissioning services. File sharing services 368 may include file management services, file storage services, file collaboration services, and the like. Policy manager services 370 may include device policy manager services, application policy manager services, data policy manager services, and the like. Social integration services 372 may include contact integration services, collaboration services, integration with social networks such as Facebook, Twitter, and LinkedIn, and the like. Application controller services 374 may include management services, provisioning services, deployment services, assignment services, revocation services, wrapping services, and the like.

The enterprise mobility technical architecture 300 may include an application store 378. The application store 378 may include unwrapped applications 380, pre-wrapped applications 382, and the like. Applications may be populated in the application store 378 from the application controller 374. The application store 378 may be accessed by the mobile device 302 through the access gateway 360, through the public Internet 348, or the like. The application store may be provided with an intuitive and easy to use user interface. The application store 378 may provide access to a software development kit 384. The software development kit 384 may provide a user the capability to secure applications selected by the user by wrapping the application as described previously in this description. An application that has been wrapped using the software development kit 384 may then be made available to the mobile device 302 by populating it in the application store 378 using the application controller 374.

The enterprise mobility technical architecture 300 may include a management and analytics capability. The management and analytics capability may provide information related to how resources are used, how often resources are used, and the like. Resources may include devices, applications, data, and the like. How resources are used may include which devices download which applications, which applications access which data, and the like. How often resources are used may include how often an application has been downloaded, how many times a specific set of data has been accessed by an application, and the like.

Figure 4:
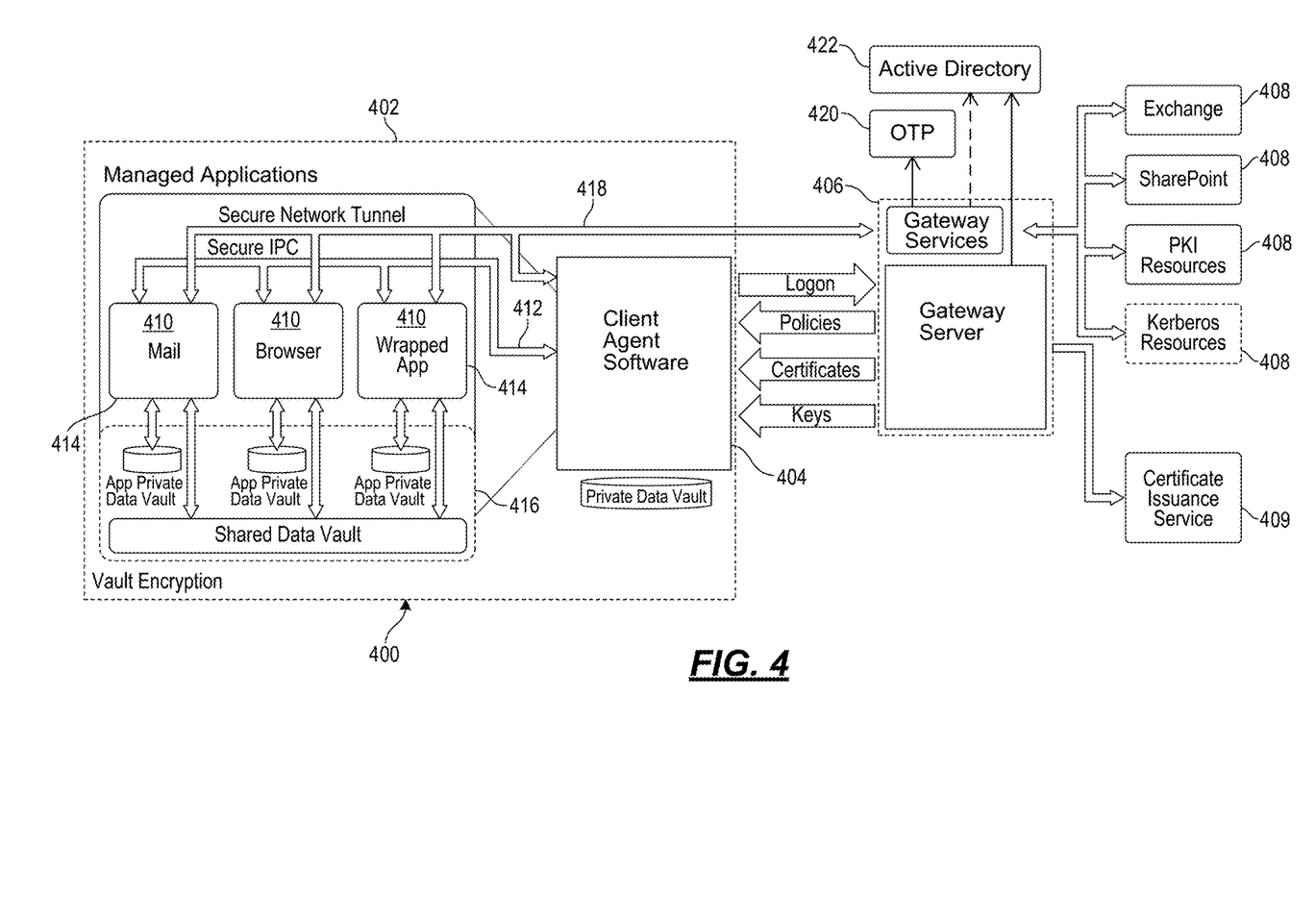
FIG. 4 depicts another illustrative enterprise mobility management system in accordance with one or more illustrative aspects described herein.

FIG. 4 is another illustrative enterprise mobility management system 400. Some of the components of the mobility management system 300 described above with reference to FIG. 3 have been omitted for the sake of simplicity. The architecture of the system 400 depicted in FIG. 4 is similar in many respects to the architecture of the system 300 described above with reference to FIG. 3 and may include additional features not mentioned above.

In this case, the left hand side represents an enrolled/managed mobile device 402 with a client agent 404, which interacts with gateway server 406 (which includes access gateway and application controller functionality) to access various enterprise resources 408 and services 409 such as Exchange, Sharepoint, PKI Resources, Kerberos Resources, and Certificate Issuance Service, as shown on the right hand side above. Although not specifically shown, the mobile device 402 may also interact with an application store for the selection and downloading of applications.

The client agent 404 acts as the UI (user interface) intermediary for Windows apps/desktops hosted in an Enterprise data center, which are accessed using a display remoting protocol, such as but not limited to the ICA protocol. The client agent 404 also supports the installation and management of native applications on the mobile device 402, such as native iOS or Android applications. For example, the managed applications 410 (mail, browser, wrapped application) shown in the figure above are all native applications that execute locally on the device. Client agent 404 and the application management framework (AMF) of this architecture act to provide policy driven management capabilities and features such as connectivity and SSO (single sign on) to enterprise resources/services 408. The client agent 404 handles primary user authentication to the enterprise, normally to the access gateway (AG) with SSO to other gateway server components. The client agent 404 obtains policies from gateway server 406 to control the behavior of the AMF managed applications 410 on the mobile device 402.

The secure IPC links 412 between the native applications 410 and client agent 404 represent a management channel, which allows client agent to supply policies to be enforced by the application management framework 414 "wrapping" each application. The IPC channel 412 also allows client agent 404 to supply credential and authentication information that enables connectivity and SSO to enterprise resources 408. Finally the IPC channel 412 allows the application management framework 414 to invoke user interface functions implemented by client agent 404, such as online and offline authentication.

Communications between the client agent 404 and gateway server 406 are essentially an extension of the management channel from the application management framework 414 wrapping each native managed application 410. The application management framework 414 requests policy information from client agent 404, which in turn requests it from gateway server 406. The application management framework 414 requests authentication, and client agent 404 logs into the gateway services part of gateway server 406 (also known as NetScaler Access Gateway). Client agent 404 may also call supporting services on gateway server 406, which may produce input material to derive encryption keys for the local data vaults 416, or provide client certificates which may enable direct authentication to PKI protected resources, as more fully explained below.

In more detail, the application management framework 414 "wraps" each managed application 410. This may be incorporated via an explicit build step, or via a post-build processing step. The application management framework 414 may "pair" with client agent 404 on first launch of an application 410 to initialize the secure IPC channel and obtain the policy for that application. The application management framework 414 may enforce relevant portions of the policy that apply locally, such as the client agent login dependencies and some of the containment policies that restrict how local OS services may be used, or how they may interact with the application 410.

The application management framework 414 may use services provided by client agent 404 over the secure IPC channel 412 to facilitate authentication and internal network access. Key management for the private and shared data vaults 416 (containers) may be also managed by appropriate interactions between the managed applications 410 and client agent 404. Vaults 416 may be available only after online authentication, or may be made available after offline authentication if allowed by policy. First use of vaults 416 may require online authentication, and offline access may be limited to at most the policy refresh period before online authentication is again required.

Network access to internal resources may occur directly from individual managed applications 410 through the access gateway 406. The application management framework 414 is responsible for orchestrating the network access on behalf of each application 410. Client agent 404 may facilitate these network connections by providing suitable time limited secondary credentials obtained following online authentication. Multiple modes of network connection may be used, such as reverse web proxy connections and end-to-end VPN-style tunnels 418.

The mail and browser managed applications 410 have special status and may make use of facilities that might not be generally available to arbitrary wrapped applications. For example, the mail application may use a special background network access mechanism that allows it to access Exchange over an extended period of time without requiring a full AD logon. The browser application may use multiple private data vaults to segregate different kinds of data.

This architecture supports the incorporation of various other security features. For example, gateway server 406 (including its gateway services) in some cases will not need to validate AD passwords. It can be left to the discretion of an enterprise whether an AD password is used as an authentication factor for some users in some situations. Different authentication methods may be used if a user is online or offline (i.e., connected or not connected to a network).

Step up authentication is a feature wherein gateway server 406 may identify managed native applications 410 that are allowed to have access to highly classified data requiring strong authentication, and ensure that access to these applications is only permitted after performing appropriate authentication, even if this means a re-authentication is required by the user after a prior weaker level of login.

Another security feature of this solution is the encryption of the data vaults 416 (containers) on the mobile device 402. The vaults 416 may be encrypted so that all on-device data including files, databases, and configurations are protected. For on-line vaults, the keys may be stored on the server (gateway server 406), and for off-line vaults, a local copy of the keys may be protected by a user password. When data is stored locally on the device 402 in the secure container 416, it is preferred that a minimum of AES 256-bit encryption algorithm be utilized.

Other secure container features may also be implemented. For example, a logging feature may be included, wherein all security events happening inside an application 410 are logged and reported to the backend. Data wiping may be supported, such as if the application 410 detects tampering, associated encryption keys may be written over with random data, leaving no hint on the file system that user data was destroyed. Screenshot protection is another feature, where an application may prevent any data from being stored in screenshots. For example, the key window's hidden property may be set to YES. This may cause whatever content is currently displayed on the screen to be hidden, resulting in a blank screenshot where any content would normally reside.

Local data transfer may be prevented, such as by preventing any data from being locally transferred outside the application container, e.g., by copying it or sending it to an external application. A keyboard cache feature may operate to disable the autocorrect functionality for sensitive text fields. SSL certificate validation may be operable so the application specifically validates the server SSL certificate instead of it being stored in the keychain. An encryption key generation feature may be used such that the key used to encrypt data on the device is generated using a passphrase supplied by the user (if offline access is required). It may be XORed with another key randomly generated and stored on the server side if offline access is not required. Key derivation functions may operate such that keys generated from the user password use KDFs (key derivation functions, notably PBKDF2) rather than creating a cryptographic hash of it. The latter makes a key susceptible to brute force or dictionary attacks.

Further, one or more initialization vectors may be used in encryption methods. An initialization vector will cause multiple copies of the same encrypted data to yield different cipher text output, preventing both replay and cryptanalytic attacks. This will also prevent an attacker from decrypting any data even with a stolen encryption key if the specific initialization vector used to encrypt the data is not known. Further, authentication then decryption may be used, wherein application data is decrypted only after the user has authenticated within the application. Another feature may relate to sensitive data in memory, which may be kept in memory (and not in disk) only when it's needed. For example, login credentials may be wiped from memory after login, and encryption keys and other data inside objective-C instance variables are not stored, as they may be easily referenced. Instead, memory may be manually allocated for these.

An inactivity timeout may be implemented, wherein after a policy-defined period of inactivity, a user session is terminated.

Data leakage from the application management framework 414 may be prevented in other ways. For example, when an application 610 is put in the background, the memory may be cleared after a predetermined (configurable) time period. When backgrounded, a snapshot may be taken of the last displayed screen of the application to fasten the foregrounding process. The screenshot may contain confidential data and hence should be cleared.

Another security feature relates to the use of an OTP (one time password) 420 without the use of an AD (active directory) 422 password for access to one or more applications. In some cases, some users do not know (or are not permitted to know) their AD password, so these users may authenticate using an OTP 420 such as by using a hardware OTP system like SecurID (OTPs may be provided by different vendors also, such as Entrust or Gemalto). In some cases, after a user authenticates with a user ID, a text is sent to the user with an OTP 420. In some cases, this may be implemented only for online use, with a prompt being a single field.

An offline password may be implemented for offline authentication for those applications 410 for which offline use is permitted via enterprise policy. For example, an enterprise may want the enterprise application store to be accessed in this manner. In this case, the client agent 404 may require the user to set a custom offline password and the AD password is not used. Gateway server 406 may provide policies to control and enforce password standards with respect to the minimum length, character class composition, and age of passwords, such as described by the standard Windows Server password complexity requirements, although these requirements may be modified.

Another feature relates to the enablement of a client side certificate for certain applications 410 as secondary credentials (for the purpose of accessing PKI protected web resources via a micro VPN feature). For example, an application such as @WorkMail may utilize such a certificate. In this case, certificate-based authentication using ActiveSync protocol may be supported, wherein a certificate from the client agent 404 may be retrieved by gateway server 406 and used in a keychain. Each managed application may have one associated client certificate, identified by a label that is defined in gateway server 406.

Gateway server 406 may interact with an enterprise special purpose web service to support the issuance of client certificates to allow relevant managed applications to authenticate to internal PKI protected resources.

The client agent 404 and the application management framework 414 may be enhanced to support obtaining and using client certificates for authentication to internal PKI protected network resources. More than one certificate may be supported, such as to match various levels of security and/or separation requirements. The certificates may be used by the mail and browser managed applications, and ultimately by arbitrary wrapped applications (provided those applications use web service style communication patterns where it is reasonable for the application management framework to mediate HTTPS requests).

Client certificate support on iOS may rely on importing a PKCS 12 BLOB (Binary Large Object) into the iOS keychain in each managed application for each period of use. Client certificate support may use a HTTPS implementation with private in-memory key storage. The client certificate will never be present in the iOS keychain and will not be persisted except potentially in "online-only" data value that is strongly protected.

Mutual SSL may also be implemented to provide additional security by requiring that a mobile device 402 is authenticated to the enterprise, and vice versa. Virtual smart cards for authentication to gateway server 406 may also be implemented.

Both limited and full Kerberos support may be additional features. The full support feature relates to an ability to do full Kerberos login to AD 422, using an AD password or trusted client certificate, and obtain Kerberos service tickets to respond to HTTP negotiate authentication challenges. The limited support feature relates to constrained delegation in AGEE, where AGEE supports invoking Kerberos protocol transition so it can obtain and use Kerberos service tickets (subject to constrained delegation) in response to HTTP negotiate authentication challenges. This mechanism works in reverse web proxy (a.k.a. CVPN) mode, and when HTTP (but not HTTPS) connections are proxied in VPN and MicroVPN mode.

Another feature relates to application container locking and wiping, which may automatically occur upon jail-break or rooting detections, and occur as a pushed command from administration console, and may include a remote wipe functionality even when an application 410 is not running.

A multi-site architecture or configuration of the enterprise application store and application controller may be supported that allows users to be service from one of several different locations in case of failure.

In some cases, managed applications 410 may be allowed to access a certificate and private key via an API (example OpenSSL). Trusted managed applications 410 of an enterprise may be allowed to perform specific Public Key operations with an application's client certificate and private key. Various use cases may be identified and treated accordingly, such as when an application behaves like a browser and no certificate access is required, when an application reads a certificate for "who am I," when an application uses the certificate to build a secure session token, and when an application uses private keys for digital signing of important data (e.g. transaction log) or for temporary data encryption.

Processing an Incoming Data Processing Message or Request

In some situations, a user of a computing device or mobile device 107, 109, 240, 302, 402 may use a feature where data or documents can be exchanged or sent between different applications on the mobile device 302, and the user may use the feature to send data or documents to a secure application running within the managed partition 310. The feature may be an open in feature where a document or data generated, stored, or opened in one application is sent to another application for processing, for example, for opening in the receiving application or a destination application. As another example, an e-mail application may be a secure application running within the managed partition 310, and a user may send a document from an unmanaged application to the secure e-mail application for attaching to an e-mail. As another example, a user may wish to prevent photo files provided by an unmanaged camera application from entering a secure application, such as a text or photo editing and/or processing application, running within the managed partition 310.

The managed partition 310 may have policies applied to it including a policy directed to processing incoming data processing requests or messages or processing data processing requests or messages directed to an application in the managed partition 310, managed applications, or wrapped applications 410. When an incoming data processing message or request is sent to an application in the managed partition 310, the incoming data processing request may be checked or processed based on policies applied to the managed partition 310 and on the source or contents of the request. The wrapper may receive this request in the form of a message that may be passed from one application to another via the operating system of the computing device or mobile device 302, 402. For example, the incoming data processing request may be checked or processed by the integrated policies included in secure application wrapper 320 which determines whether to allow the incoming data processing message to pass modified or unmodified to the receiving application. The check on the incoming data processing request may be hooked to the main launch function or method of an application, for example, the onCreate( ) method on Android.

Figure 5:
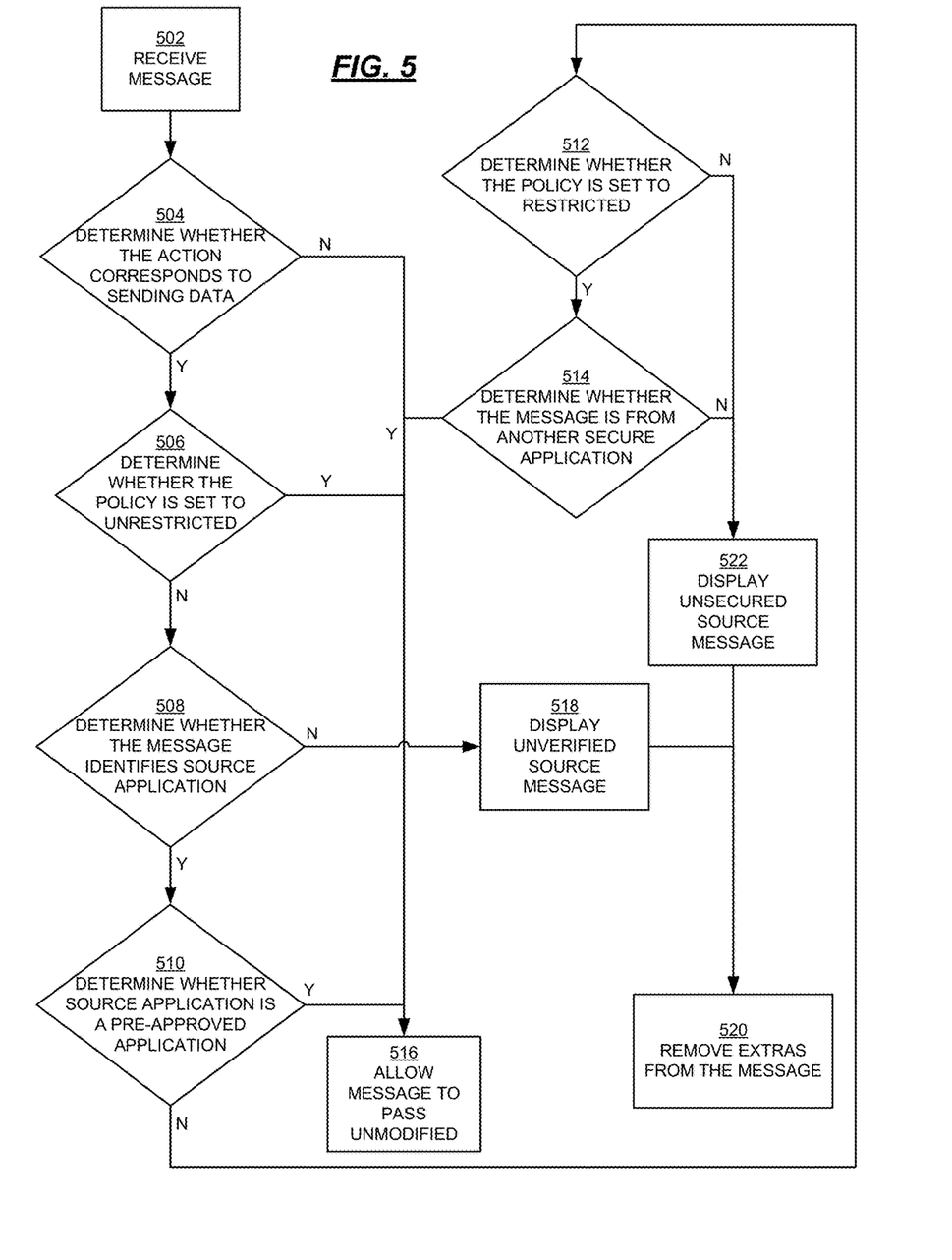
FIG. 5 depicts an illustrative method for controlling incoming data processing requests in accordance with one or more illustrative aspects described herein.

FIG. 5 shows an illustrative method 500 of processing an incoming data processing request for an application on a mobile device 302, 402. The incoming data processing request may be processed based on whether the source of the request is a trusted or untrusted source. At step 502, secure application wrapper 320 may receive a message. The message may include data and an action to be performed on the data. For example, on a device with an Android operating system, the message may include an intent object which contains an action to be performed and data on which the action is to be performed. At step 504, the wrapper 320 may determine whether the action requested in the message corresponds to sending one or more sets of data to the application for processing by the receiving application. For example, the wrapper may determine whether the action is a "SEND" or "SEND_MULTIPLE" action in the case of Android. If the wrapper determines that the action requested in the incoming message does not correspond to sending data for processing by a receiving application, the wrapper can allow the message to pass into the application unmodified for processing in accordance with the action specified in the message at step 516. If the wrapper determines that the action requested in the incoming message corresponds to sending data for processing by the receiving application (e.g., "SEND" or "SEND_MULTIPLE" action), the method may proceed to step 506 and determine whether the policy for application interaction for incoming data processing requests is set to unrestricted.

The policy for application interaction may be set to unrestricted, restricted, or blocked. For an unrestricted setting, any type of application inbound data interaction or exchange may be allowed. For a restricted setting, inbound data interaction or exchange may be allowed only with other secure wrapped applications 314, 410 because the other secure wrapped applications 314, 410 may be considered to be trusted sources. For a blocked setting, no inbound data interaction or exchange may be allowed. A default value of unrestricted may be used.

At step 506, the wrapper may determine whether the policy is set to unrestricted. If the policy is set to unrestricted, the application may proceed to step 516 and allow the message to pass into the application unmodified for processing in accordance with the action specified in the message. If the policy is not set to unrestricted, the wrapper may proceed to step 508 and determine whether the message identifies its source application. For example, the wrapper may determine if the message includes an identifier for the source application. If at step 508 the application determines that the message does not identify its source application, the wrapper may proceed to step 518 and display an unverified source message on the screen to the user. The unverified source message may indicate to a user that the data, documents, or attachments in the message were blocked because the source of the message could not be verified. Before, after, or concurrent with step 518, the wrapper may perform step 520 and remove or filter out additional or optional information from the message such as a uniform resource identifier (URI) identifying a stream of data associated with the action, a text string, a string of hypertext markup language (html) formatted text, and html type data. In the case of an Android based system, the additional or optional information may be called extras or may be standard extra data for the intent object. The specific extras to be removed for an Android based device may be the constants EXTRA_STREAM, EXTRA_TEXT, or EXTRA_HTML_TEXT or may be ishtml or any form of html type data.

Figure 6:
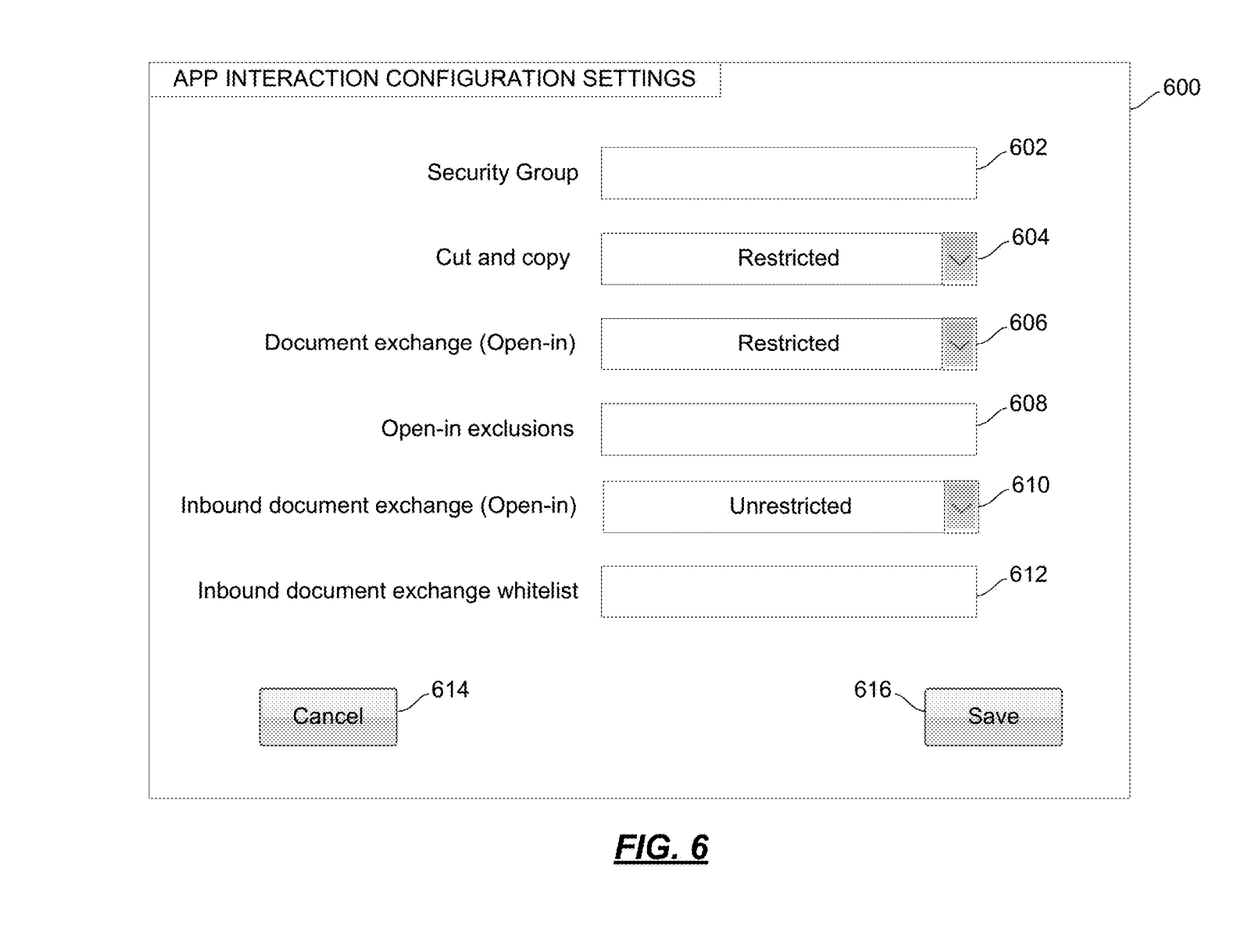
FIG. 6 depicts an illustrative user interface for configuring app interaction settings.

If the message identifies its source application, the wrapper may proceed to step 510 and determine whether the source application is a pre-approved application. A pre-approved application may include the sending application, secure native applications 314, secure application launcher 318, and secure remote applications 322 and/or virtualization applications 326 which can be executed by secure application launcher 318. The sending application may be sending data to itself and therefore be pre-approved. The user or a security administrator may specify, for example, via the configuration interface 600 which particular applications may be pre-approved for incoming data interaction. If the source application is a pre-approved application, the wrapper may proceed to step 516 and allow the message from the source application to pass unmodified for processing. If the source application is not a pre-approved application, the wrapper may proceed to step 512 and determine whether the policy is set to restricted. If the policy is not set to restricted, the receiving application may proceed to step 522 and display an unsecured source message on the screen to the user. The unsecure source message may inform the user that data, documents, or attachments were blocked because the source of the message might not be secure. On the other hand, if the wrapper determines that the policy is set to restricted in step 512, the wrapper may proceed to step 514 and determine whether the message is from an application running in the managed partition 310. If the message is from an application running in the managed partition 310, the wrapper may proceed to step 516 and allow the message to pass unmodified into the receiving application for processing by the destination or receiving application. If the message not from an application running in the managed partition 310, the wrapper may proceed to step 522 and display the unsecured source message to the user and remove the additional or optional information from the message at step 520 as discussed herein above.

FIG. 6 illustrates an example user interface for configuring app interaction settings 600. A security administrator may manage or set the security settings for devices. In field 602, the administrator can specify a security group for the application running in the managed partition 310. Using dropdown menu 604, the administrator can select a unrestricted, restricted, or blocked setting for cut and copy functions. Similarly, the administrator can select a unrestricted, restricted, or blocked setting for outbound document exchange or open-in actions using dropdown menu 606. In field 608, the administrator can specify specific objects (e.g., text to speech object) or applications excluded from outbound open-in. With dropdown menu 610, the user can select unrestricted, restricted, or blocked for inbound document exchange or open-ins as discussed above with respect to FIG. 5. In field 612, the user can input applications which are pre-approved by adding applications to a whitelist. Using button 616, the user can save the configuration settings, or the user can cancel any changes made using button 614.

While aspects described herein have been described based on evaluating the source application with respect to the inbound document exchange setting, the passing of the message to the receiving application may be evaluated based on the data type or content of the data included in the message with respect to the inbound document exchange setting. Additionally, while the specific examples have been given with respect to the Android operating system, the aspects described herein may be similarly implemented on other operating systems including but not limited to Apple's iOS operating system and Microsoft's Windows operating system.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims. Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps described and/or illustrated herein may be performed in other than the recited order, and that one or more steps illustrated may be optional in accordance with aspects of the disclosure. Modifications may be made, particularly in light of the foregoing teachings. For example, each of the elements of the aforementioned embodiments may be utilized alone or in combination or sub-combination with elements of the other embodiments. It will also be appreciated and understood that modifications may be made without departing from the spirit and scope of the aspects described herein.

What is claimed is:

1. A method, comprising:
   receiving, by a secure application wrapper implemented on a computing device comprising a processor, a message containing data, the message indicating an action to perform on the data and a destination application within the secure application wrapper on the computing device;
   determining, by the secure application wrapper, that the message does not identify a source application;
   determining, by the secure application wrapper, a content type of the data;
   identifying an optional part of the data; and
   after determining that the message does not identify a source application, creating a modified message by removing, based on the content type of the data, at least a portion of the data from the message, wherein the portion of the data is different from the optional part of the data.

2. The method of claim 1, wherein the destination application comprises a secure e-mail application, a secure text processing application, or a secure photo editing application, and the method further comprises:
   removing the optional part of the data from the message.

3. The method of claim 1, further comprising:
   receiving input, via a graphical user interface, assigning a security setting for a destination application; and
   wherein removing at least a portion of the data from the message is further based on the assigned security setting for the destination application.

4. The method of claim 1, further comprising:
   displaying an unverified source notification to a user; and
   allowing the modified message to be sent to the destination application.

5. The method of claim 4, wherein the unverified source notification comprises information describing the content type of the data and the portion of the data that was removed from the message.

6. The method of claim 5, wherein the unverified source notification further comprises an indication of blocking the action to be performed on the data.

7. The method of claim 1, wherein the portion of the data removed from the message comprises a uniform resource identifier associated with the action.

8. A system, comprising:
   a computing device comprising at least one processor; and
   at least one memory storing computer-readable instructions that, when executed by the at least one processor, cause the system to perform:
   receiving, by a secure application wrapper implemented by the at least one processor, a message containing data, the message indicating an action to perform on the data and a destination application within the secure application wrapper on the computing device;
   determining, by the secure application wrapper, that the message does not identify a source application;
   identifying an optional part of the data; and
   after determining that the message does not identify a source application, creating a modified message by removing at least a portion of the data from the message, wherein the portion of the data is different from the optional part of the data.

9. The system of claim 8, wherein the destination application comprises a secure e-mail application, a secure text processing application, or a secure photo editing application.

10. The system of claim 8, wherein the computer-readable instructions further cause the system to perform:
    responsive to removing a portion of the data, displaying a notification describing the portion of the data that is removed and describing that the portion of the data was removed because the message does not identify a source application.

11. The system of claim 8, wherein the memory storing computer-readable instructions that, when executed by the at least one processor, further cause the system to perform:
    displaying an unverified source notification to a user; and
    allowing the modified message to be sent to the destination application.

12. The system of claim 11, wherein the unverified source notification comprises information describing the portion of the data that was removed from the message.

13. The system of claim 8, wherein the portion of the data removed from the message comprises a uniform resource identifier associated with the action.

14. One or more non-transitory computer-readable storage media having computer-readable instructions stored thereon, that when executed by one or more processors, cause the one or more processors to perform:
    receiving, by a secure application wrapper implemented by the one or more processors, a message containing data, the message indicating an action to perform on the data and a destination application within the secure application wrapper;

determining, by the secure application wrapper, that the message does not identify a source application;

identifying an optional part of the data; and after determining that the message does not identify a source application, creating a modified message by removing at least a portion of the data from the message, wherein the portion of the data is different from the optional part of the data.

15. The computer-readable storage media of claim 14, wherein the computer-readable instructions further cause the one or more processors to perform:

determining whether a policy setting for application interaction is set to unrestricted; and responsive to determining that the policy setting for application interaction is set to unrestricted, sending the message, by the secure application wrapper, to the destination application.

16. The computer-readable storage media of claim 14, wherein the computer-readable instructions further cause the one or more processors to perform:

receiving input, via a graphical user interface, that indicates a security setting for a destination application.

17. The computer-readable storage media of claim 14, wherein the computer-readable instructions further cause the one or more processors to perform:

displaying an unverified source notification to a user; and allowing the modified message to be sent to the destination application.

18. The computer-readable storage media of claim 17, wherein the unverified source notification comprises information describing the portion of the data that was removed from the message.

19. The computer-readable storage media of claim 18, wherein the unverified source notification further comprises an indication of blocking the action to be performed on the data.

20. The computer-readable storage media of claim 14, wherein the portion of the data removed from the message comprises a uniform resource identifier associated with the action.

* * * * *